(12) United States Patent
Kim

(10) Patent No.: US 7,667,172 B2
(45) Date of Patent: Feb. 23, 2010

(54) IMAGE SENSOR WITH EXPANDING DYNAMIC RANGE

(75) Inventor: Yong-hwan Kim, Gyeonggi-do (KR)

(73) Assignee: Mtekvision Co., Ltd., Seoul (KR)

( * ) Notice: Subject to any disclaimer, the term of this patent is extended or adjusted under 35 U.S.C. 154(b) by 356 days.

(21) Appl. No.: 11/577,850

(22) PCT Filed: Dec. 23, 2004

(86) PCT No.: PCT/KR2004/002418

§ 371 (c)(1),
(2), (4) Date: Apr. 24, 2007

(87) PCT Pub. No.: WO2006/046792

PCT Pub. Date: May 4, 2006

(65) Prior Publication Data

US 2009/0127434 A1    May 21, 2009

(30) Foreign Application Priority Data

Oct. 29, 2004   (KR) .................... 10-2004-0087357

(51) Int. Cl.
*H01L 27/146* (2006.01)
(52) U.S. Cl. .................... 250/208.1; 257/292; 348/243
(58) Field of Classification Search ............ 250/208.1; 348/243; 257/292
See application file for complete search history.

(56) References Cited

U.S. PATENT DOCUMENTS 5,471,515 A * 11/1995 Fossum et al. ............... 377/60
5,801,773 A    9/1998  Ikeda

FOREIGN PATENT DOCUMENTS

| JP | 07135599 | 5/1995 |
| KR | 10-2004-0011064 | 2/2004 |
| WO | WO 02-076090 | 9/2002 |

\* cited by examiner

*Primary Examiner*—Georgia Y Epps
*Assistant Examiner*—Tony Ko
(74) *Attorney, Agent, or Firm*—Birch, Stewart, Kolasch & Birch, LLP

(57) ABSTRACT

A conventional image sensor has a narrow dynamic range, so that the conventional image sensor has the limitation of not representing very dark portions or very bright portions depending on the exposure time when representing an image having such dark and bright portions. The present invention provides an image sensor including at least two storage units for respectively storing at least two image signals; a first switch unit for performing switching applied image signals to be respectively stored in the at least two storage units; and a second switch unit respectively connected to the at least two storage units and for equalizing the image signals stored in the at least two storage units.

17 Claims, 17 Drawing Sheets

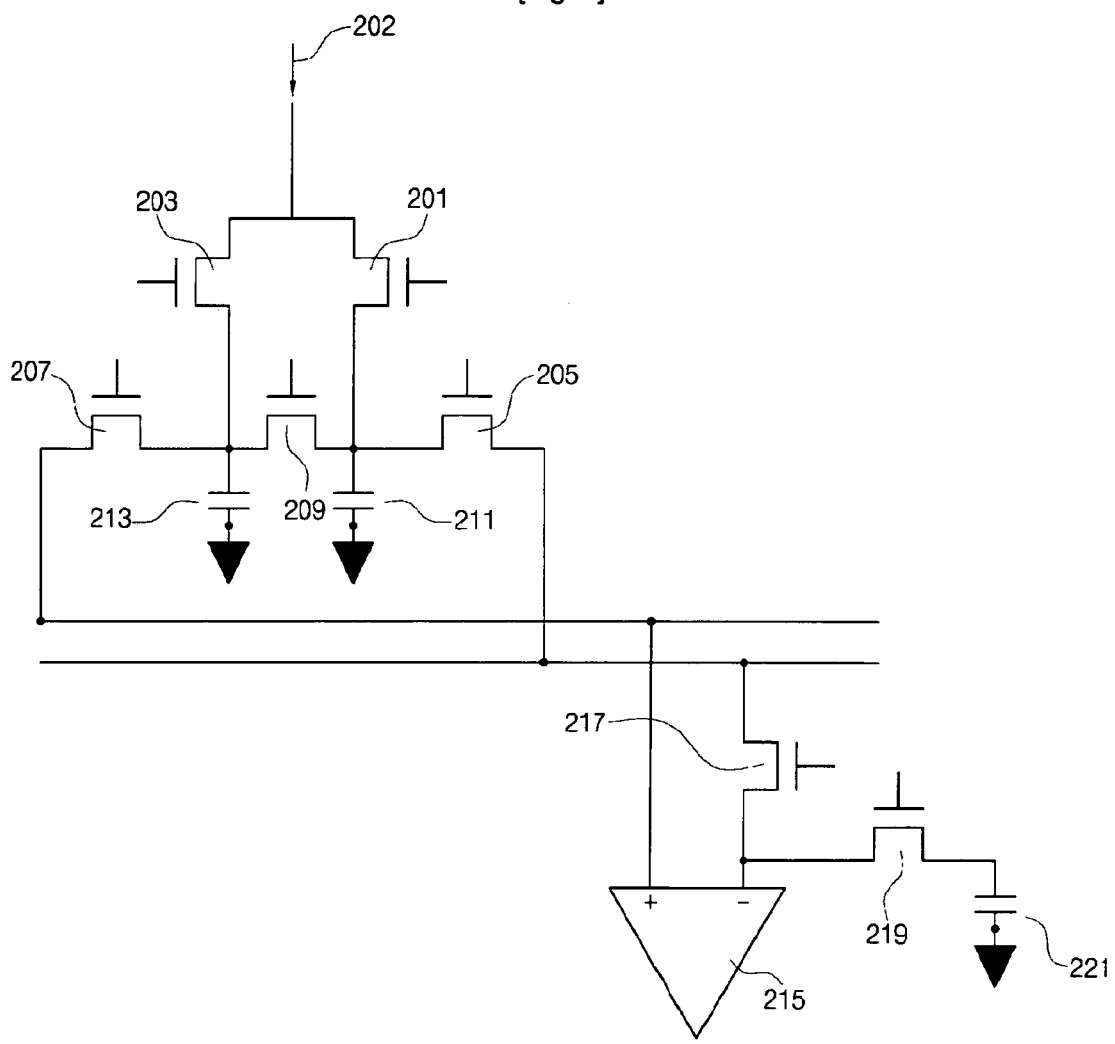
[Fig. 2]

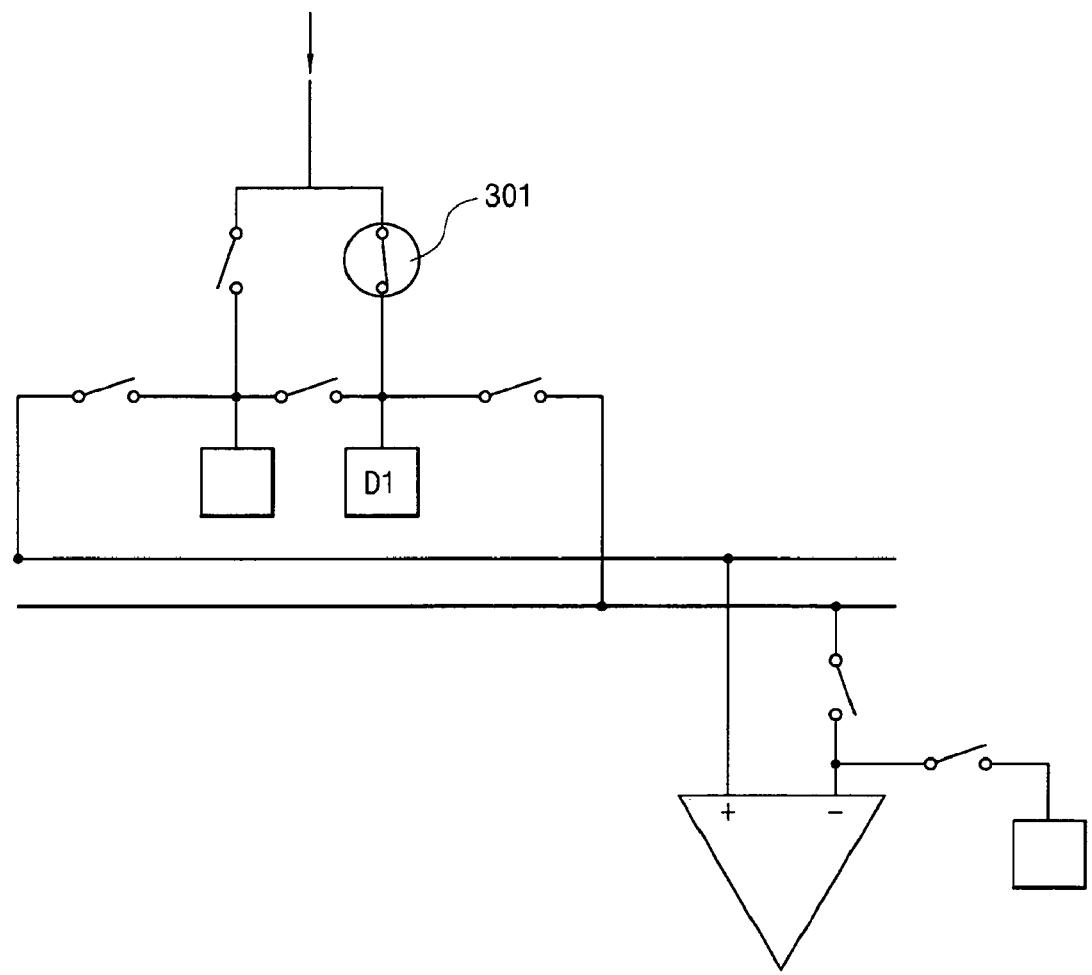
[Fig. 3]

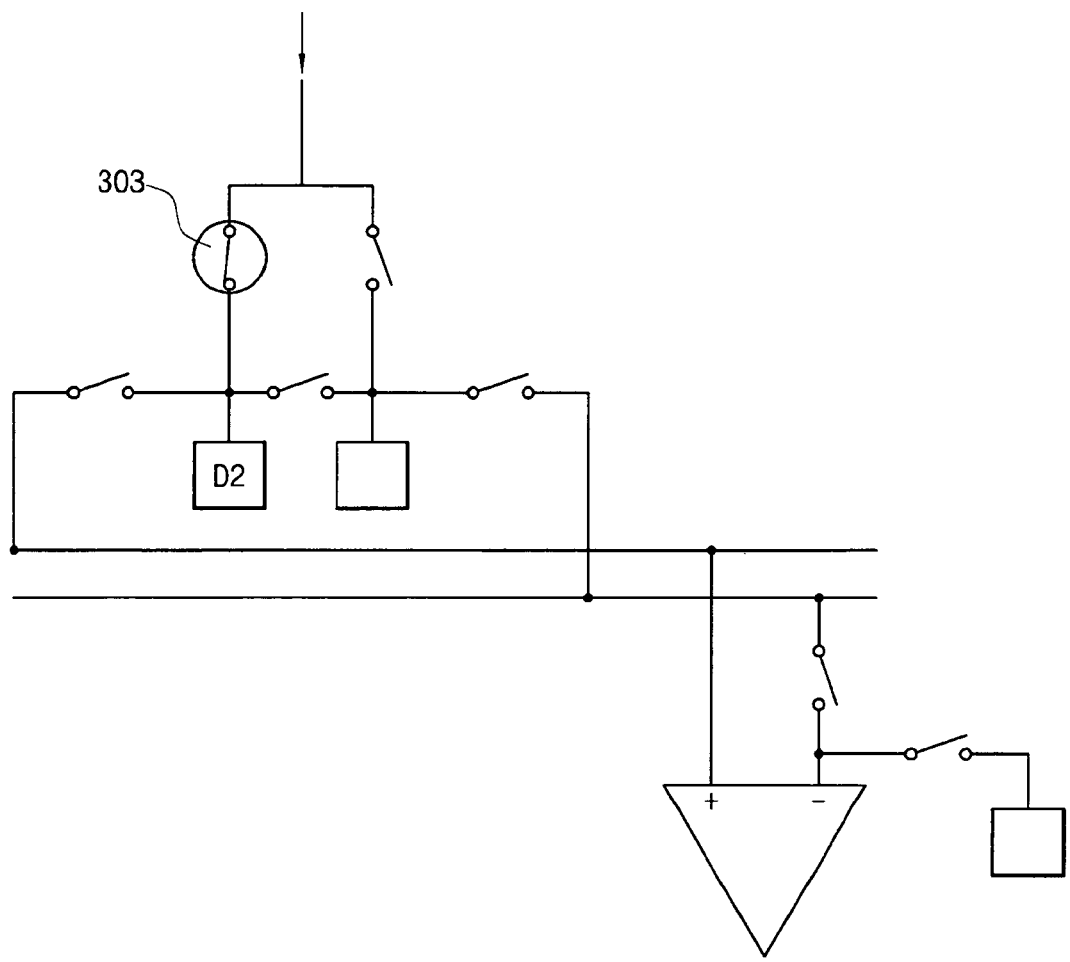
[Fig. 4]

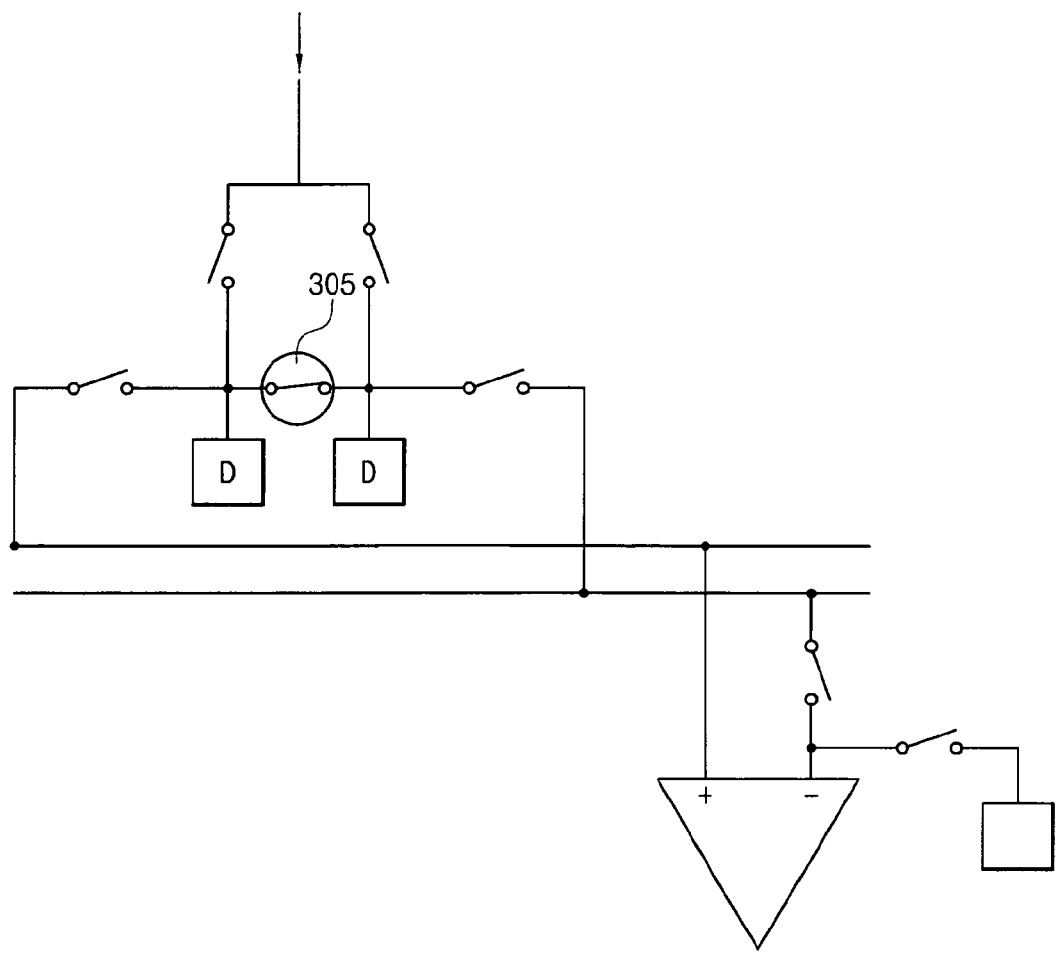
[Fig. 5]

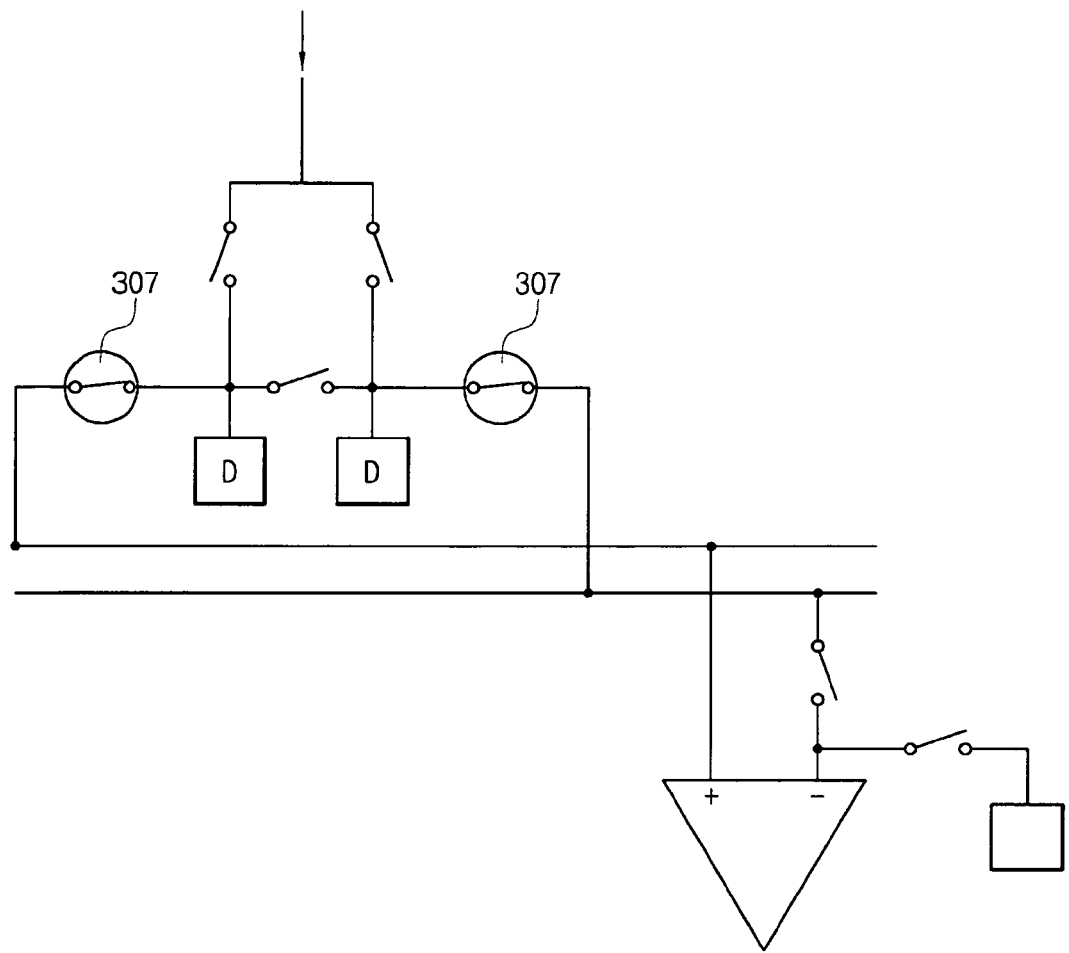

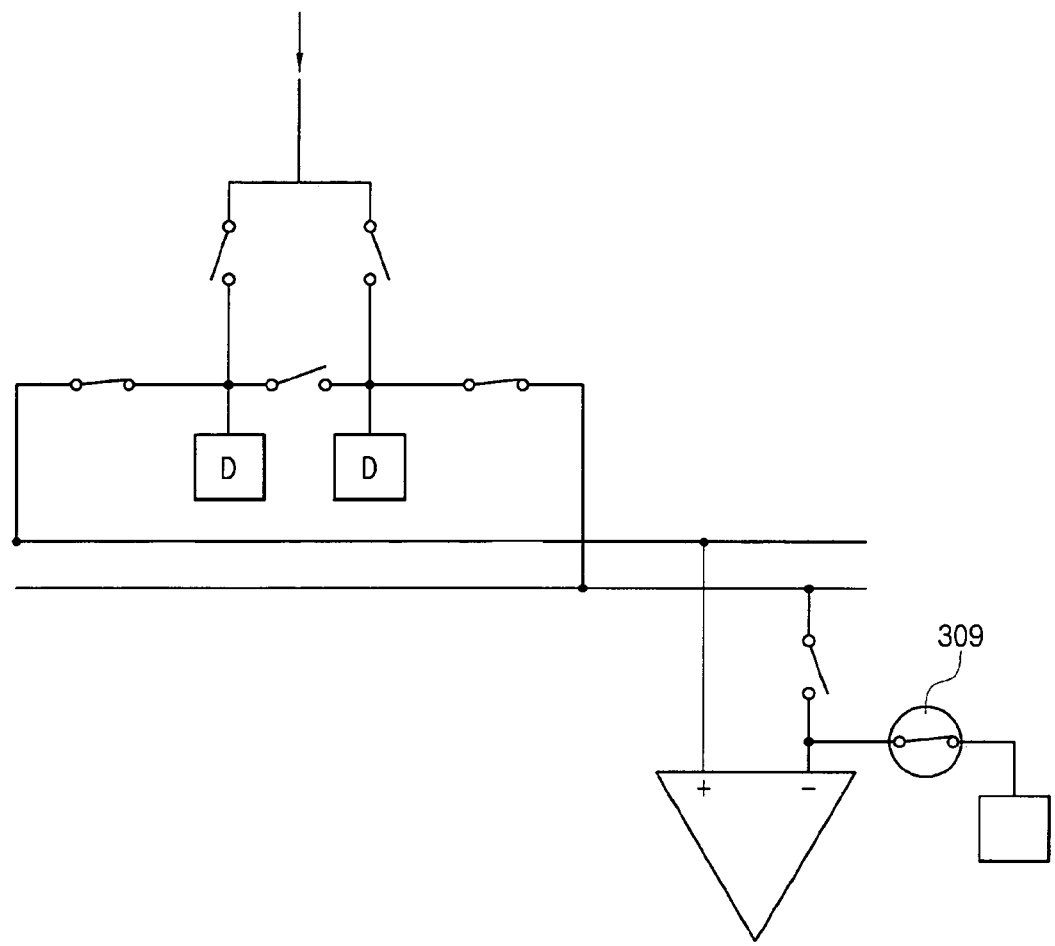
[Fig. 7]

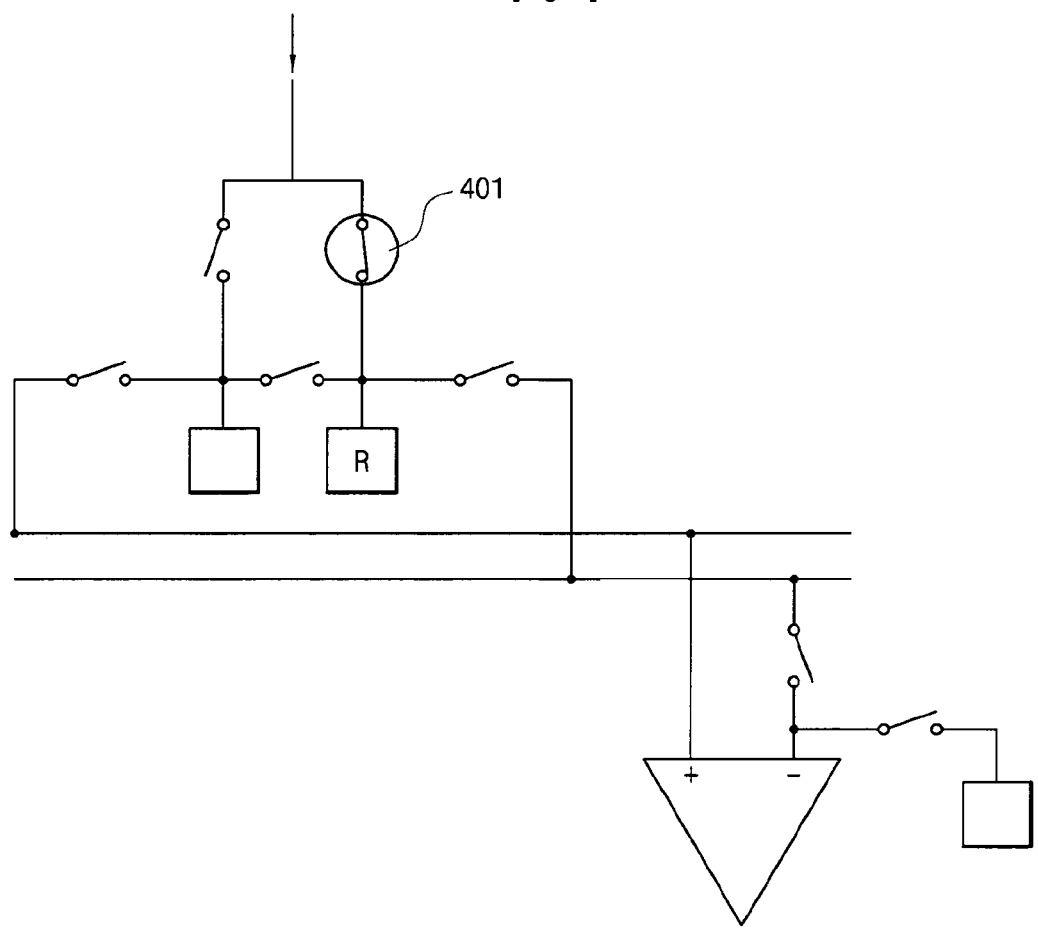
[Fig. 8]

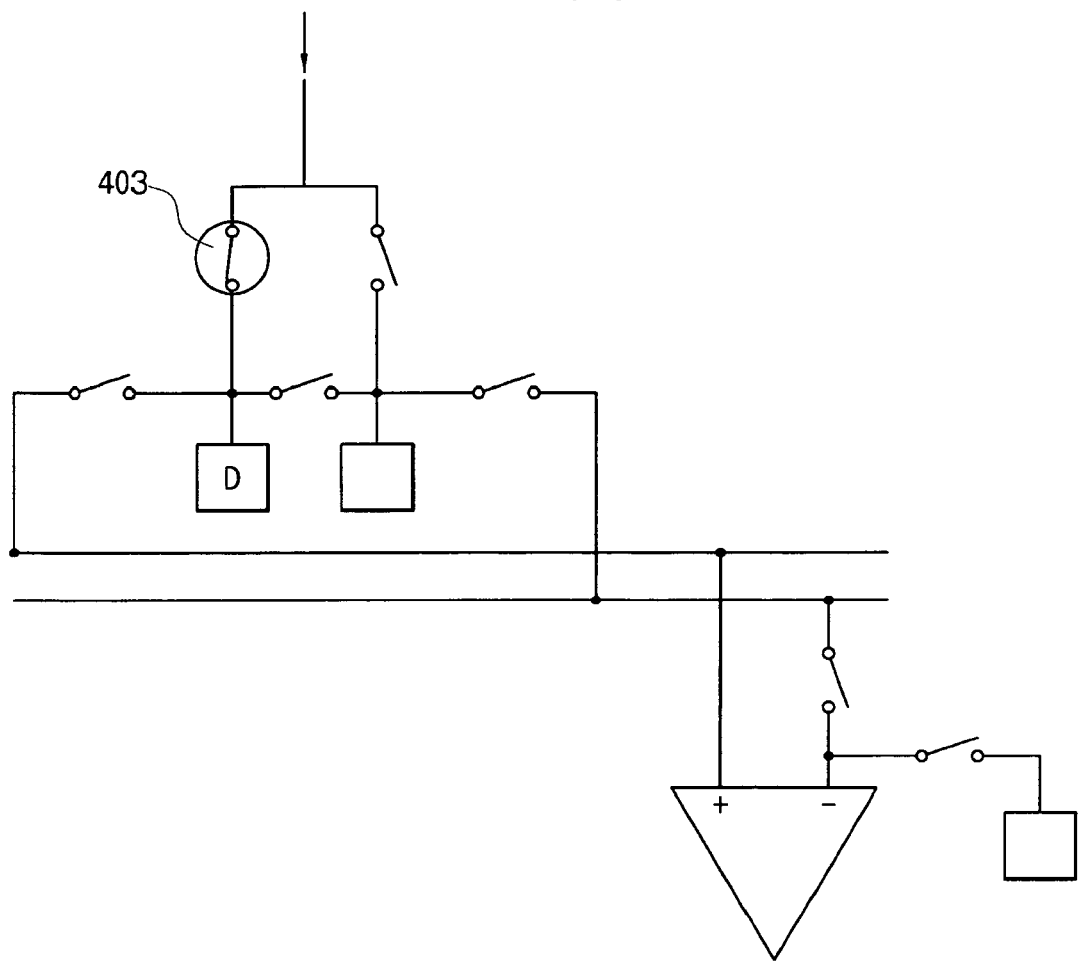
[Fig. 9]

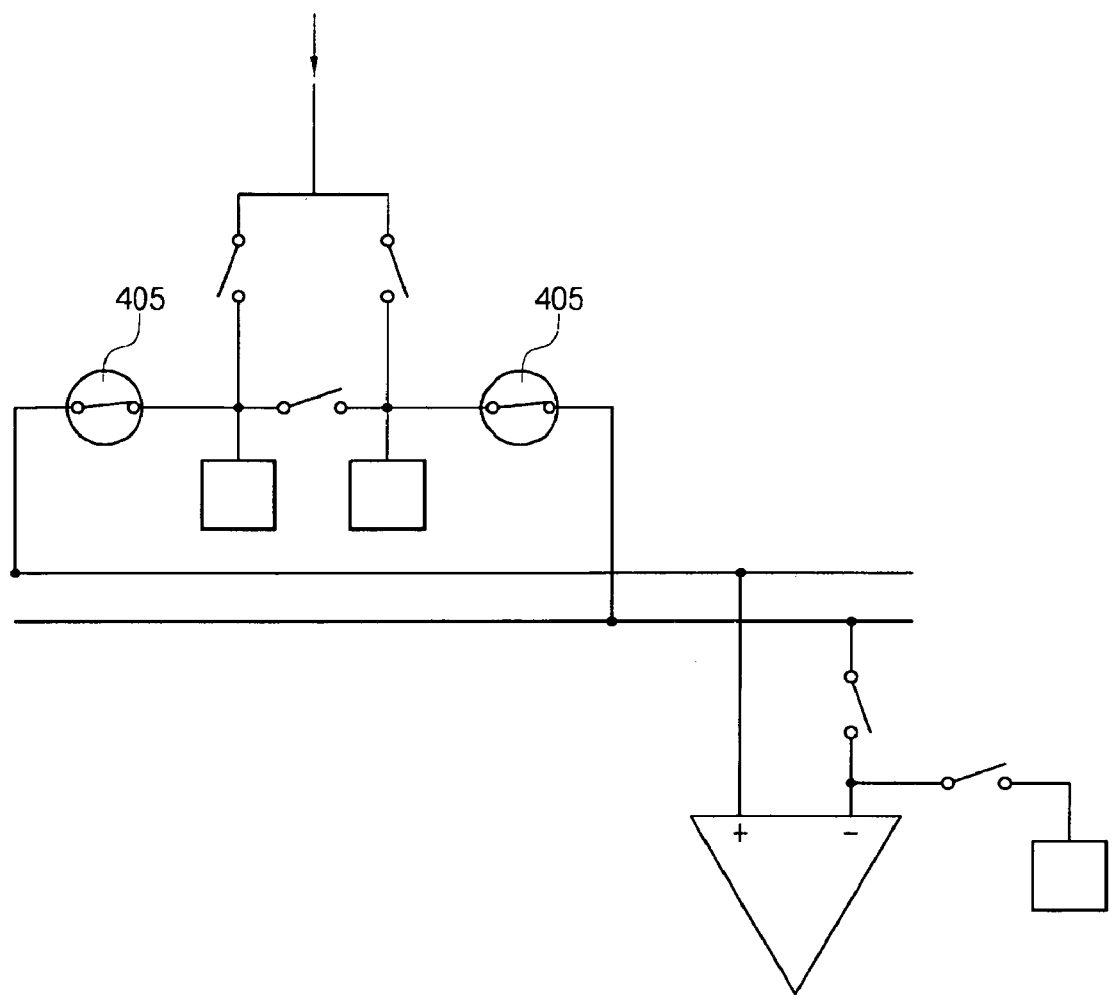
[Fig. 10]

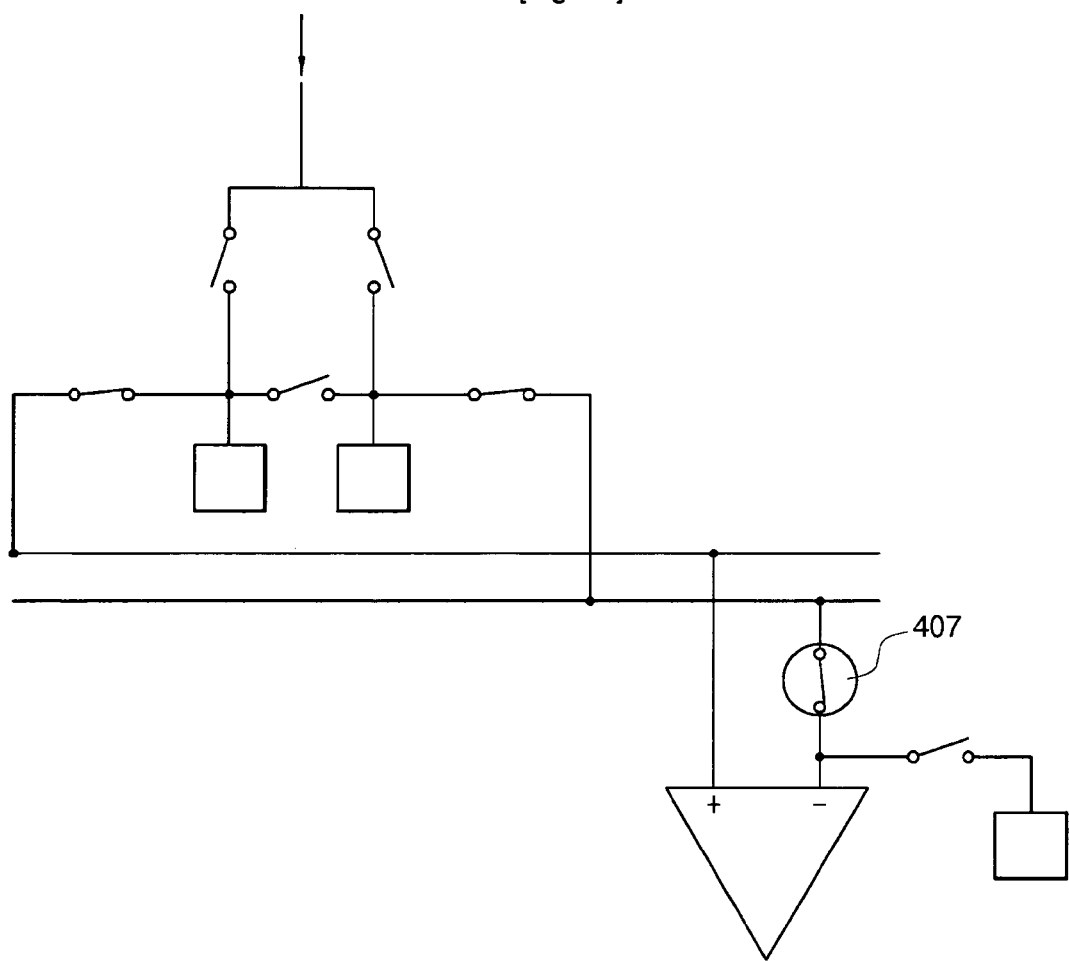
[Fig. 11]

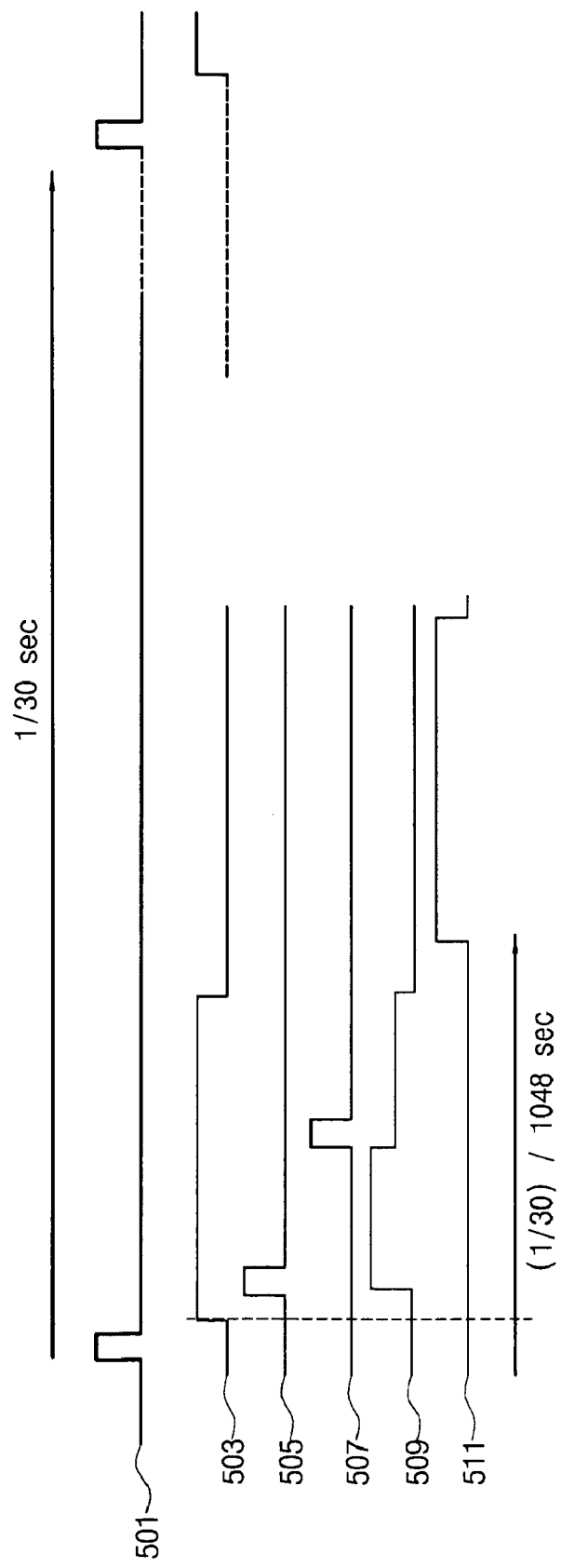

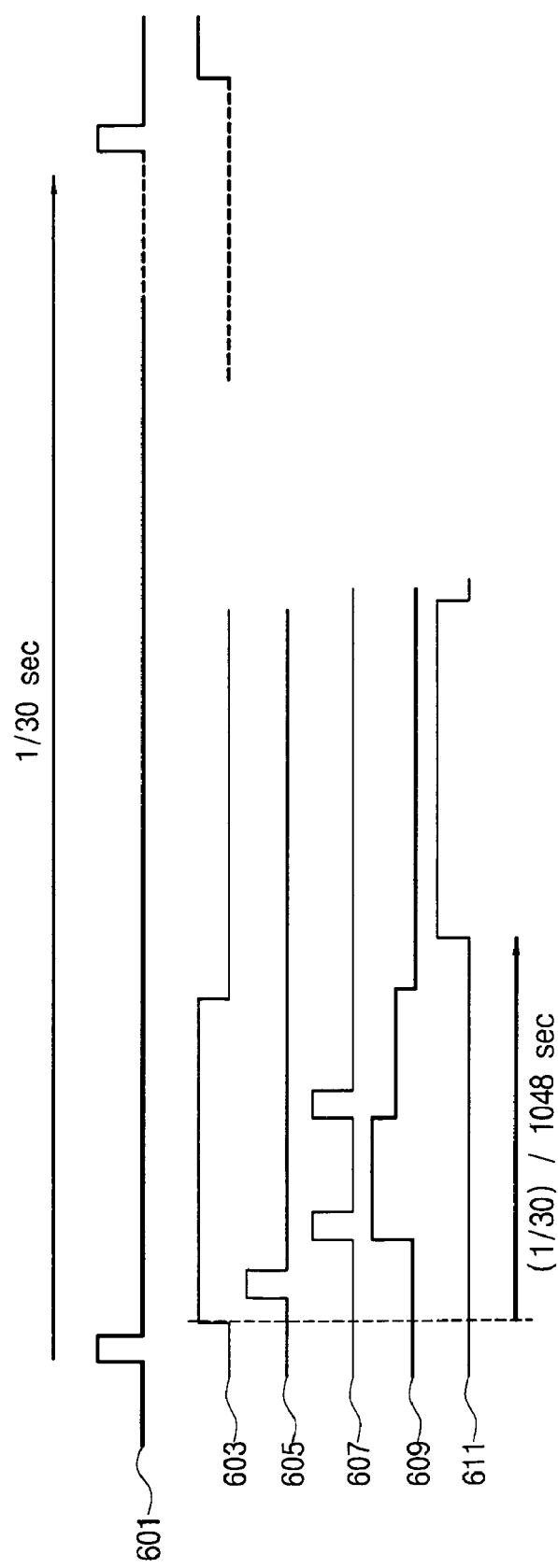
[Fig. 13]

[Fig. 14]
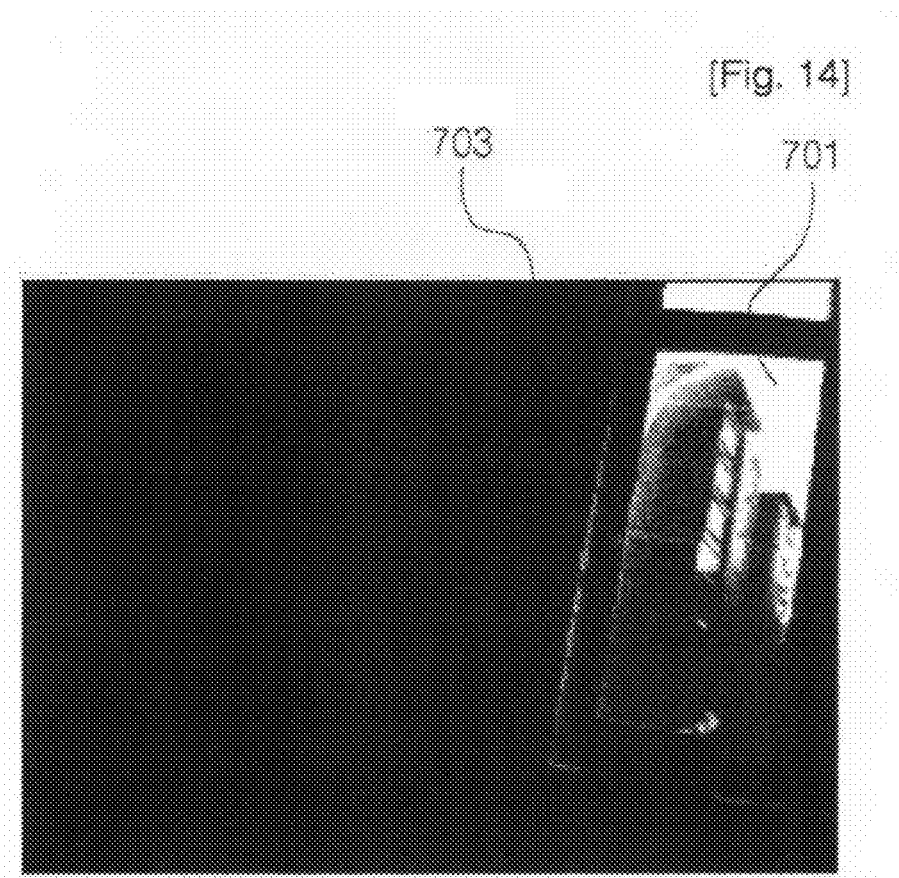
[Fig. 15]
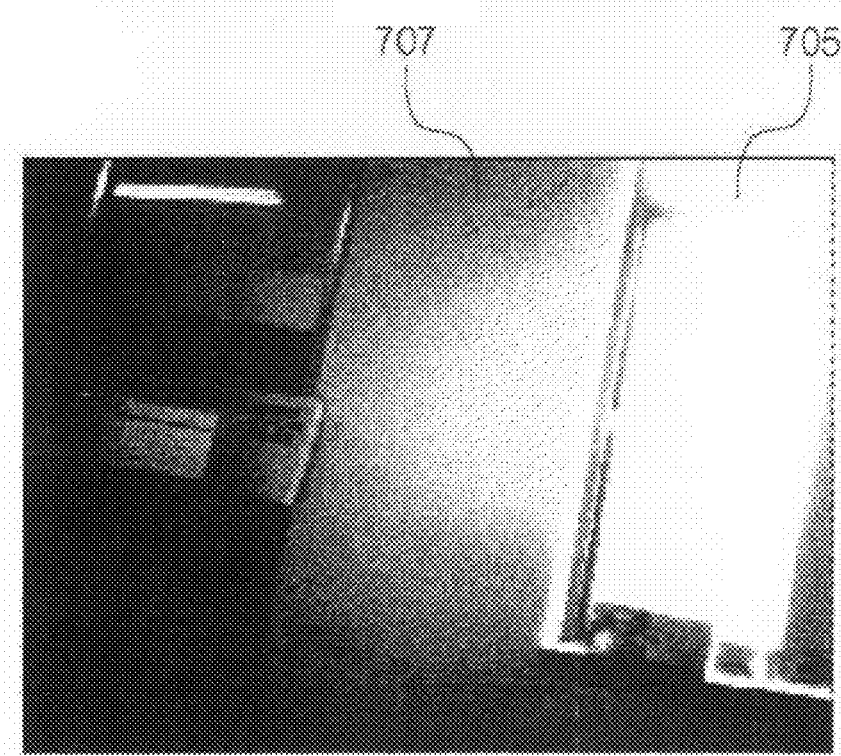

storage units for storing at least two image signals respectively; a first switch unit for switching applied image signals to be stored in the at least two storage units respectively; and a second switch unit respectively connected to the at least two storage units and for equalizing the image signals stored in the at least two storage units.

IMAGE SENSOR WITH EXPANDING DYNAMIC RANGE

TECHNICAL FIELD

The present invention relates to an image sensor for expanding dynamic range.

BACKGROUND ART

Generally, an image sensor refers to a semiconductor device which converts an optical image into an electric signal. Of such image sensors, a Charge Coupled Device (CCD) is a device in which respective Metal Oxide Semiconductor (MOS) capacitors are very close to each other and charge carriers are stored in and carried by the capacitors, and a Complementary metal-oxide semiconductor Imaging Sensor (CIS) refers to a device which employs a switching method. In the switching method, the number of MOS transistors are equal to the number of pixels using CMOS technology that employs a control circuit and a signal processing circuit as peripheral circuits, and the outputs are sequentially detected using the transistors. Since the CIS has a great advantage in that power consumption is small, the CIS is very useful for personal, portable systems such as mobile phones.

Meanwhile, one of the significant criteria for evaluating the quality of an image device is the dynamic range. The dynamic range generally represents a maximum range in which an input signal can be processed without distortion. For the image sensor, as the dynamic range thereof becomes wider, desired images can be acquired regardless of the amount of brightness variation.

FIG. 1 is a diagram showing a schematic circuit diagram of a conventional CMOS image sensor, which is compared with the present invention.

Referring to FIG. 1, a photodiode 101 functions to convert light energy into electric energy depending on light intensity. Transistors 103, 105, 107 and 109 transfer the electric image signal converted by the photodiode 101 to a comparator 111. A ramp signal 113 is a reference signal used to convert the electric signal generated by the photodiode 101 into a digital signal. The comparator 111 compares the ramp signal with the image signal generated by the photodiode 101 and digitizes the image signal. The digitized image signal is stored in memory 115.

However, the conventional image sensor has a narrow dynamic range, so that, when representing a very dark portion and a very bright portion in one image, as shown in FIGS. 14 and 15, the conventional image sensor has a disadvantage in that it cannot represent the dark portion or the bright portion, depending on the exposure time.

DESCRIPTION OF DRAWINGS

FIG. 2 is a diagram illustrating a switch unit located between a comparator and an image sensor, according to a preferred embodiment of the present invention;

FIGS. 3 to 7 are diagrams showing the switching sequence of the switch unit for widening the dynamic range, according to a preferred embodiment of the present invention;

FIGS. 8 to 11 are diagrams showing the operation of the switch unit in the case where the switch unit is used so as not to expand a dynamic range according to a preferred embodiment of the present invention;

FIG. 12 is a timing diagram of the control signals of the image sensor in the case where the image sensor is operated in a general mode according to a preferred embodiment of the present invention;

FIG. 13 is a timing diagram of the control signals of the image sensor in the case where the image sensor operates in a wide dynamic range mode according to the preferred embodiment of the present invention;

FIGS. 14 to 16 are photos showing the actual capture results in the wide dynamic range mode according to the preferred embodiment of the present invention;

DISCLOSURE

Technical Problem

Figure 1:
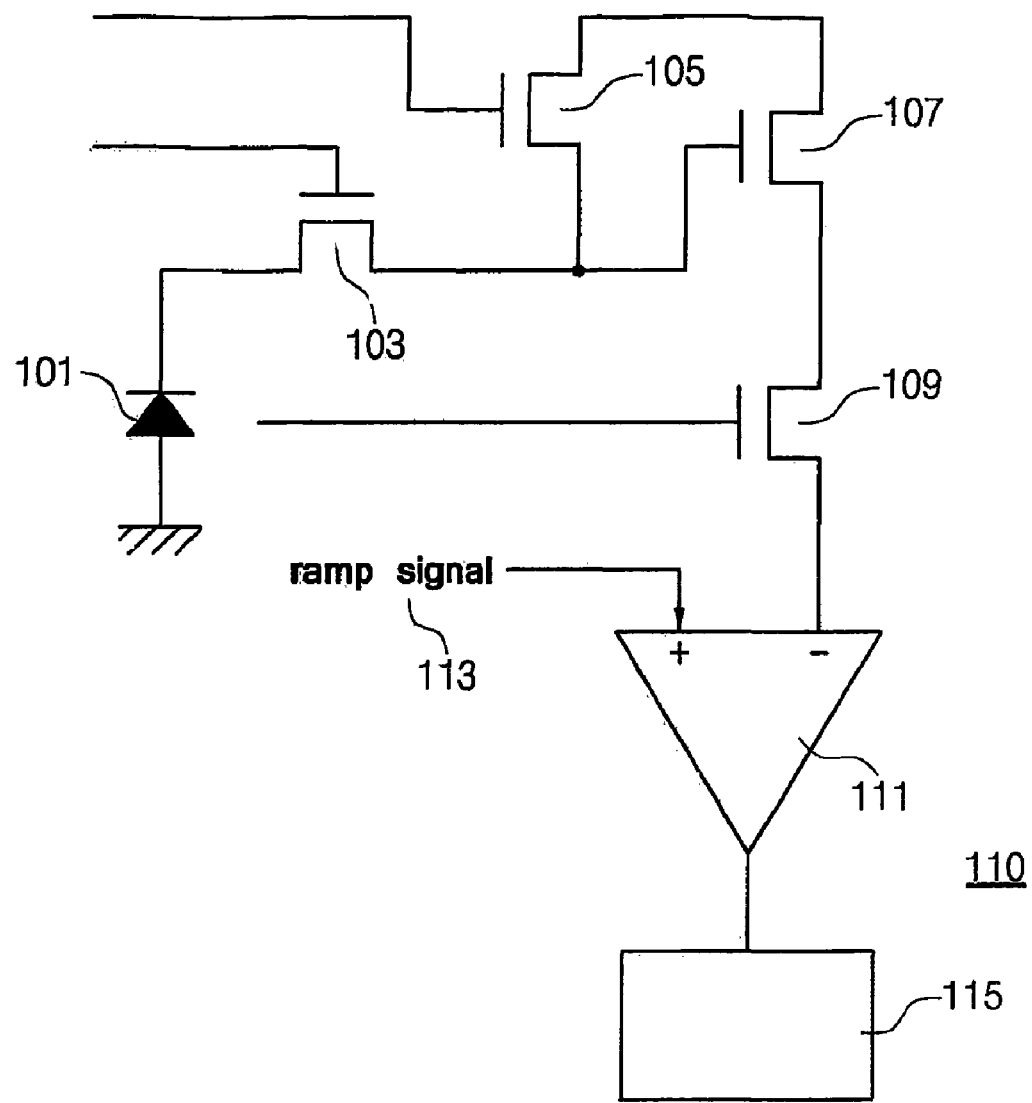
FIG. 1 is a diagram showing a schematic circuit of a conventional CMOS image sensor, which is compared with the present invention.

Accordingly, the present invention has been made keeping in mind the above problems occurring in the prior art, and an object of the present invention is to provide an image sensor having a wide dynamic range.

Another object of the present invention is to provide an image sensor, which reads an image twice using different exposure times and then combines the two image signals together, thereby properly representing an image having high contrast.

Technical Solution

In order to accomplish the above objects, the one aspect of the present invention provides an image sensor, comprising at least two storage units for storing at least two image signals respectively; a first switch unit for switching applied image signals to be stored in the at least two storage units respectively; and a second switch unit respectively connected to the at least two storage units and for equalizing the image signals stored in the at least two storage units.

In a preferred embodiment, the storage units may be capacitors.

Furthermore, the first switch unit may include at least two switches respectively connected to the at least two storage units.

Furthermore, the switches may be transistors.

Furthermore, the second switch unit may be a transistor.

Furthermore, the image signals stored in the at least two storage units may be represented by voltage.

Furthermore, the second switch unit may be connected in series to each of the at least two storage units.

Furthermore, the equalizing may be performed by switching the image signals to an average value.

Furthermore, the equalized image signals may be respectively stored in the at least two storage units.

In another aspect of the present invention, there is provided an image sensor comprising a first input line; a second input line; a third input line; a comparator connected to the first, second and third lines; and a switch unit for switching one of signals, which are input through the second and third lines, to be input to the comparator.

Furthermore, a signal input to the first input line may be an image signal.

Furthermore, a signal input to the second input line may be a reset signal.

Furthermore, a signal input to the third input line may be an average reset signal.

Furthermore, the switch unit may include at least one transistor.

In another aspect of the present invention, there is provided an image sensor comprising at least two storage units for respectively storing at least two image signals; a first switch unit for switching applied image signals to be stored in the at least two storage units respectively; a second switch unit respectively connected to the at least two storage units and for equalizing the image signals stored in the at least two storage units; a first input line to which an equalized image signal is input; a second input line to which a predetermined average reset signal is input; and a comparator connected to the first and second lines and for comparing the equalized image signal with the predetermined average reset signal.

In still another aspect of the present invention, there is provided a signal processing method in an image sensor comprising the steps of receiving at least two image signals; equalizing the at least two image signals; comparing the equalized image signal with a predetermined average reset signal; and outputting a digitized image signal based on a result of the comparison.

In still another aspect of the present invention, there is provided an a signal processing method in an image sensor comprising the steps of receiving at least two image signals; equalizing the at least two image signals; comparing the equalized image signal with a predetermined average reset signal; and generating a digitized image signal based on a result of the comparison.

In still another aspect of the present invention, there is provided a processor for receiving at least two image signals; equalizing the at least two image signals; comparing the equalized image signal with a predetermined average reset signal; and outputting a digitized image signal based on a result of the comparison.

Advantageous Effects

In accordance with the present invention, an image sensor having a wide dynamic range can be provided.

Furthermore, in accordance with the present invention, an image sensor, which reads an image twice using different exposure times and then combines the two image signals together, thereby properly representing an image having high contrast, can be provided.

Best Mode

Preferred embodiments of the present invention will be described in detail below with reference to the accompanying drawings.

FIG. 2 is a diagram illustrating a switch unit located between a comparator and an image sensor, according to a preferred embodiment of the present invention.

The switch unit includes an input signal line 202 for receiving a signal from the image sensor, a first switch unit 201 and 203 for switching depending on the type of input signal, a memory unit 213 and 211 for storing the input signal according to the type of input signal, a second switch unit 209 for equalizing signals stored in the memory unit, a third switch unit 205 and 207 for transmitting the signals stored in the memory unit to the comparator, a fourth switch unit 217 for determining whether to transmit the signal stored in the memory unit to the comparator, memory 221 for storing an average reset signal and a switch 219 for determining the transmission of the signal stored in the memory.

Transistors may be generally used as the switch units, and a capacitor may be generally used as the memory.

The switch unit may operate similarly to a conventional image sensor depending on a selection, and can perform a switching operation for an image having a wide dynamic range. The detailed sequence of the switching operation is described below with reference to FIGS. 3 to 7 and FIGS. 8 to 11.

FIGS. 3 to 7 are diagrams showing the switching sequence of the switch unit for widening a dynamic range, according to a preferred embodiment of the present invention.

Referring to FIGS. 3 to 7, in order to expand the dynamic range, the image sensor reads an image, the bright portions of which are desirably represented, and an image, the dark portions of which are desirably represented, with different exposure times respectively and stores the respective images in different pieces of memory. And then the image sensor equalizes the signals stored in the respective pieces of memory, and compares the resulting signal with a previously stored reset signal, thereby generating an image signal.

FIG. 3 is a diagram showing a method of storing a first read image signal in the case where the switch unit of FIG. 2 reads an image according to the method for widening a dynamic range. That is, as shown in FIG. 3, only a switch 301 of the first switch unit operates, so that a signal transmitted from the image sensor is stored in one piece of memory of the memory unit. At this time, none of the remaining switches operate, so that the signal is prevented from flowing to other parts.

Then, as shown in FIG. 4, the other switch 302 of the first switch unit operates, so that the second read signal of the image sensor is stored in the other piece of memory of the memory unit. Therefore, the first image signal and the second image signal are respectively stored in the two pieces of memory. Since the signals respectively correspond to an image, the bright portions of which are desirably represented, and to an image, the dark portions of which are desirably represented, the two signals stored in the two pieces of memory need to be equalized. Since the signals are represented by voltage levels, the voltage levels stored in the two pieces of memory are naturally equalized to have the same average value if the two pieces of memory are connected to each other and, thus, electrons move freely between the pieces of memory.

As a result, as shown in FIG. 5, when a switch that connects the respective pieces of memory of the memory unit is operated, the signals stored in the memory unit are equalized. In this case, the memory unit may include two or more memory units and therefore, the switch may include two or more switches.

Furthermore, the equalization includes the equalization of signals as described above, but allows the stored images to be varied and mixed at different rates. As a result, the term "equalization" can be used to refer to the equalization of different image signals stored in respective pieces of memory to an appropriate value, not to averaging the signals.

After the equalization of the different image signals as described above, in order to transmit an equalized signal to the comparator, the switch 307 connected to the comparator is operated, as shown in FIG. 6. Then, the equalized signal is transmitted to the image sensor.

Meanwhile, of image signals transferred through the switch 307, a signal transmitted to the positive electrode of the comparator is normally delivered to the comparator, but a signal transmitted to the negative electrode of the comparator must not be delivered to the comparator. Only when a reset signal is applied to the negative electrode of the comparator, can the data signal and the reset signal be compared with each other, thereby performing accurate signal processing.

Therefore, as shown in FIG. 7, by operating the switch 309, the reset signal, which is previously stored in memory that exists upstream of the switch, is transmitted to the negative electrode of the comparator.

As a result, the average value of the signals, twice read from the image sensor, is applied to the positive electrode of the comparator, and the previously stored average reset value is applied to the negative electrode of the comparator, so that an appropriate image signal is generated in the comparator.

FIGS. 8 to 11 are diagrams showing the operation of the switch unit in the case where the switch unit is used so as not to expand the dynamic range according to a preferred embodiment of the present invention.

Referring to FIGS. 8 to 11, the switch unit may be used in such a way as to expand the dynamic range according to the situation, but can also read an image in a general manner. In the case of widening the dynamic range according to the present invention, the image sensor reads an image twice. Therefore, energy consumption may be high and a reaction speed may be relatively slow. When variation in brightness of an image is less than the dynamic range of the image sensor, it is not necessary to use the method of widening the dynamic range, as illustrated in FIGS. 3 to 7.

FIG. 8 is a diagram showing the operation of the switch unit in the case where an image is represented in a general method. In the case where an image is represented using a general method, the comparator compares a reset signal with the data signal of the image sensor and generates an image signal. Therefore, first, the reset signal of the image sensor is stored in one piece of memory of the memory unit. As shown in FIG. 8, the reset signal is stored in the one piece of memory of the memory unit by operating only the switch 401 connected to the one piece of memory of the memory unit.

Thereafter, when the image sensor reads the data signal, as shown in FIG. 9, the data signal is stored in the other piece of memory of the memory unit by operating the other switch 403 of the first switch unit. Then, the reset signal is stored in the one piece of memory of the memory unit and the data signal is in the other piece of memory.

Next, the switch 405 that connects the memory to the comparator is operated, as shown in FIG. 10. Then, the reset signal and data signal stored in the pieces of memory are respectively applied to the positive and negative electrodes of the comparator.

At this time, the reset signal applied to the negative electrode of the comparator can be connected only if the switch 407 connected to the comparator is operated. The reason why the switch exists is that it is necessary to distinguish the signal input lines depending on the operation mode.

FIG. 12 is a timing diagram of control signals applied to the image sensor in the case where the image sensor is operated in a normal mode according to a preferred embodiment of the present invention.

Referring to FIG. 12, the uppermost signal in the timing diagram is a signal 501 that indicates the start of a frame of respective image sensors. The signal indicates the start of a new frame in the image sensors. That is, it indicates that image information corresponding to one frame is acquired by reading information from all the diodes of an image sensor array.

A signal next to the frame start signal 501 is a row selection signal 503. The row selection signal 503 indicates that only one row of the image sensor array is selected. While the row selection signal 503 is high, power can be supplied to the photodiodes corresponding to the one row of the image sensor array.

A signal next to the row selection signal 503 is a reset signal 505. The reset signal 505 is a signal that resets a specific photodiode of the image sensor array. That is, when the reset signal becomes high, the transistor corresponding to the reset switch in the photodiode array operates, so that flow diffusion that exists in the photodiode circuit is reset.

The signal next to the reset signal 505 is a data signal 507. The data signal is a signal used to store an image data signal that exists in the photodiode after the flow diffusion of the image sensor array has been eliminated by the reset signal 505. That is, when the data signal 507 becomes high, the transistor corresponding to the data switch operates, so that the image data signal, which exists in the photodiode, is transmitted to a storage unit.

The signal next to the data signal 507 is a pixel out signal 509. The pixel out signal 509 represents an image signal finally generated in one photodiode of the image sensor array after passing through the comparator. The reason that the pixel out signal 509 is represented as having a step shape is that the reset signal and the data signal are compared with each other and the result is output.

The signal next to the pixel out signal 509 is again a row selection signal. Signals 505 to 509 are repeated after the second row selection signal 511.

FIG. 13 is a timing diagram of control signals applied to the image sensor in the case where the image sensor operates in a wide dynamic range mode according to the preferred embodiment of the present invention.

Referring to FIG. 13, the uppermost signal in the timing diagram is a signal 601 that indicates the start of a frame of respective image sensors. The signal indicates the start of a new frame in the image sensors. That is, it indicates that image information corresponding to one frame is acquired by reading the information from all the diodes of an image sensor array.

The signal next to the frame start signal 601 is a row selection signal 603. The row selection signal 603 indicates that only one row of the image sensor array is selected. While the row selection signal 603 is high, power can be supplied to the photodiodes corresponding to the one row of the image sensor array.

The signal next to the row selection signal 603 is a reset signal 605. The reset signal 605 is a signal that resets a specific photodiode of the image sensor array. That is, when the reset signal becomes high, the transistor corresponding to the reset switch in the photodiode array operates, so that flow diffusion, which exists in the photodiode circuit, is reset. At this time, in the case of the normal mode, the reset signal is stored in the memory, but in the wide dynamic range mode, the reset signal is not stored in the memory.

The signal next to the reset signal 605 is a data signal 607. The data signal is a signal used to store an image data signal that exists in the photodiode after the flow diffusion of the image sensor array has been eliminated by the reset signal 605. That is, when the data signal 607 becomes high, the transistor corresponding to the data switch operates, so that the image data signal, which exists in the photodiode, is transmitted to a storage unit.

Unlike the normal mode, there are two high intervals for the data signal 607. One of the two high intervals is data about an image, the exposure time of which is long so that the dark portions thereof can be read easily, and the other of the two high intervals is data about an image, the exposure time of which is short so that the bright portions thereof can be read easily. The two image data are stored in memory. That is, in the normal mode, a reset signal and a data signal are stored in the memory and then compared, whereas, in the wide dynamic range mode, the two sets of image data are respectively stored, equalized, and then compared with a previously stored average reset signal.

The signal next to the data signal 607 is a pixel out signal 609 which refers to an image signal that is finally generated in one photodiode of the image sensor array after passing through the comparator. The reason that the pixel out signal 609 is represented as having a step shape is that the reset signal and the data signal are compared with each other and the result is output. In particular, since, in the wide dynamic range mode, the reset signal is not separately stored, the previously stored average reset signal is compared with the data signal which is acquired by equalizing the two sets of image data.

The signal next to the pixel out signal 609 is again a row selection signal. Signals 605 to 609 are repeated after the second row selection signal 511.

Figure 16:
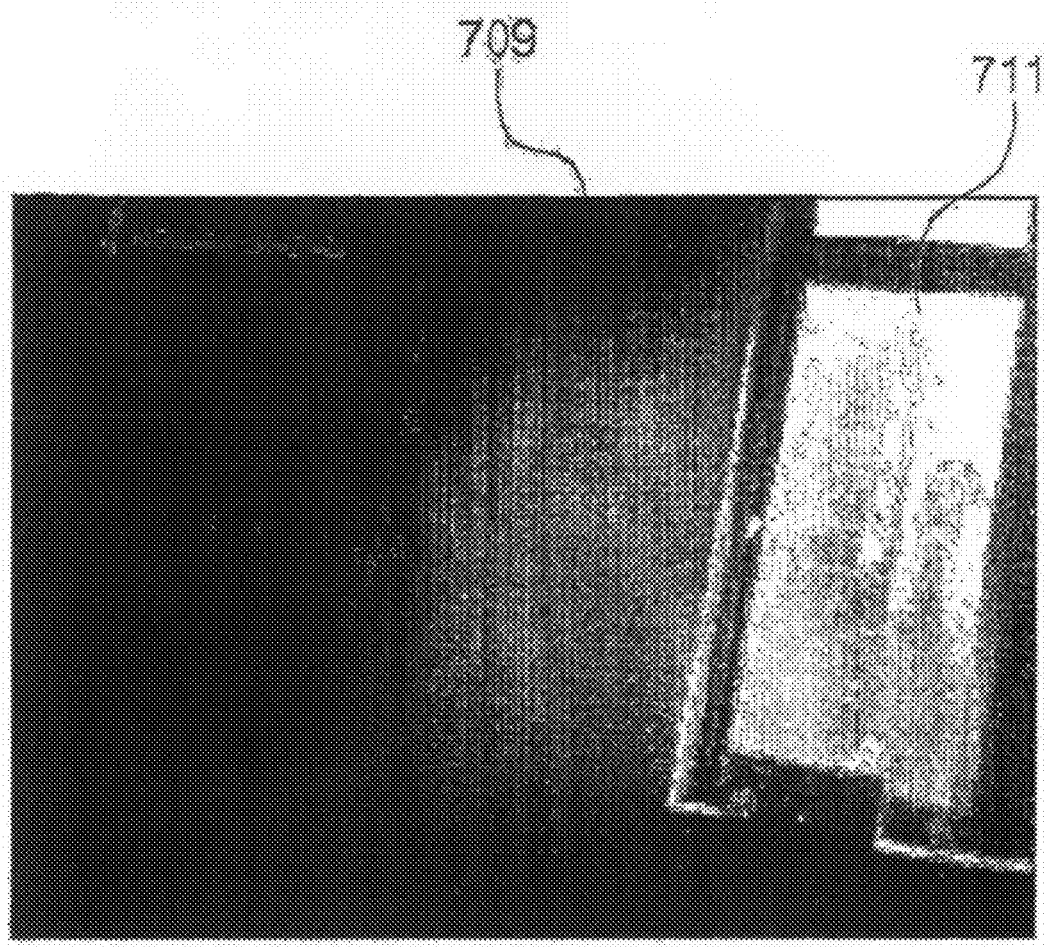

FIGS. 14 to 16 are photos showing actual captured results in the wide dynamic range mode according to the preferred embodiment of the present invention.

Referring to FIGS. 14 to 16, in the wide dynamic range mode, first, an image, the bright portions of which are desirably represented, is generated by making an exposure short. The image having the short exposure is shown in FIG. 14. In FIG. 14, shapes are clearly distinguished in a bright portion 701 viewed outside a window, but a room 703 inside the window is viewed just as a dark color. That is, the image in FIG. 14 is generated by making the exposure short to be suitable for portions having high brightness.

FIG. 15 is an image generated to be suitable for dark portions, to the contrary FIG. 14. Referring to FIG. 15, a bright portion 705 outside the window is excessively bright and, thus, is viewed just as a white color, so that it is difficult to know whether shapes exist outside the window. In contrast, the shapes are desirably represented in the room 707 inside the window. That is, the image is captured by making the exposure long so as to be suitable for the portion where brightness is low.

FIG. 16 is a photo showing an image where the image of FIG. 14 and the image of FIG. 15 are equalized. That is, the image of FIG. 16 is generated such that the image, the bright portion of which is desirably represented, and the image, the dark portion of which is desirably represented, are equalized and then all of the bright portion and the dark portion are clearly represented. In FIG. 16, the bright portion 711 outside the window is not clearer than in FIG. 14, but is not completely indiscernible, unlike FIG. 15.

Furthermore, the scene of the room 709 inside the window is desirably represented to an extent between that of FIG. 14 and that of FIG. 15.

Figure 17:
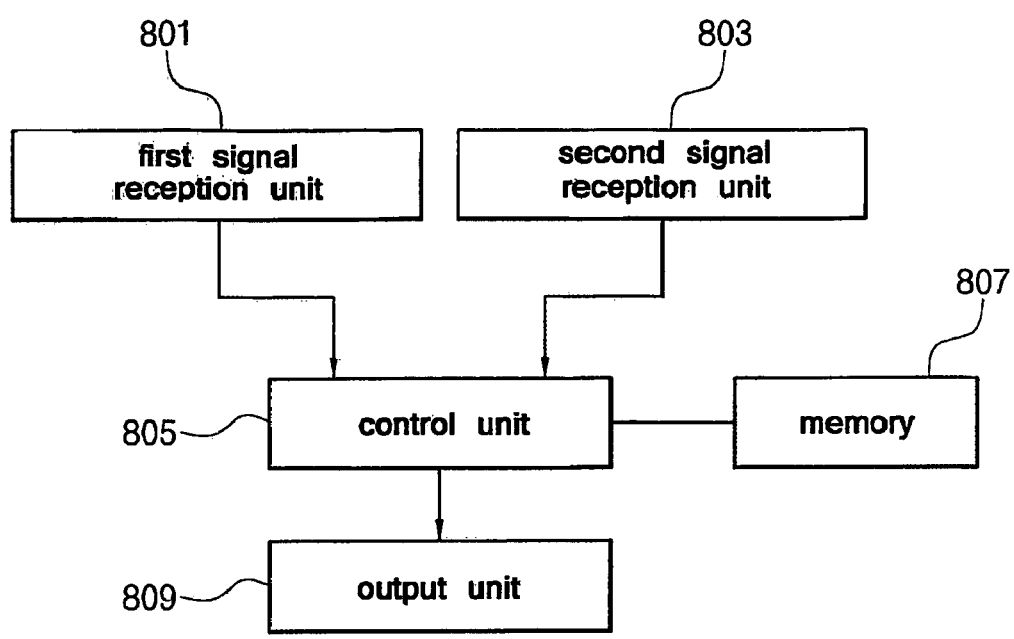
FIG. 17 is a diagram showing the construction of a processor device having the same function as the switch unit capable of providing a wide dynamic range mode according to the embodiment of the present invention.

FIG. 17 is a diagram showing the construction of a processor device having the same function as the switch unit capable of providing a wide dynamic range mode according to the embodiment of the present invention.

Referring to FIG. 17, a processor device includes a first signal reception unit 801, a second signal reception unit 803, a control unit 805, memory 807 and an output unit 809.

The first signal reception unit 801 functions to receive a first data signal generated in an image sensor array.

The second signal reception unit 803 functions to receive a second data signal generated in the image sensor array or a reset signal generated in the image sensor array depending on the operation mode. In addition to the first and second reception units 801 and 803, more reception units may be added if necessary, and a single signal line can be physically used.

The control unit 805 controls the overall operation of the processor device. In particular, the control unit 805 functions to equalize the received signals from the signal reception units and compare the reset signal stored in the memory with an equalized signal.

The memory 807 functions to store the received signals from the signal reception units and to transmit the received signals so that they can be used when the control unit 805 equalizes the received signals. Furthermore, the memory 807 functions to store an average reset signal to be compared with the equalized reception data signal in the wide dynamic range mode.

The output unit 809 functions to output an image data signal which is acquired through the comparison in the control unit 805.

Figure 18:
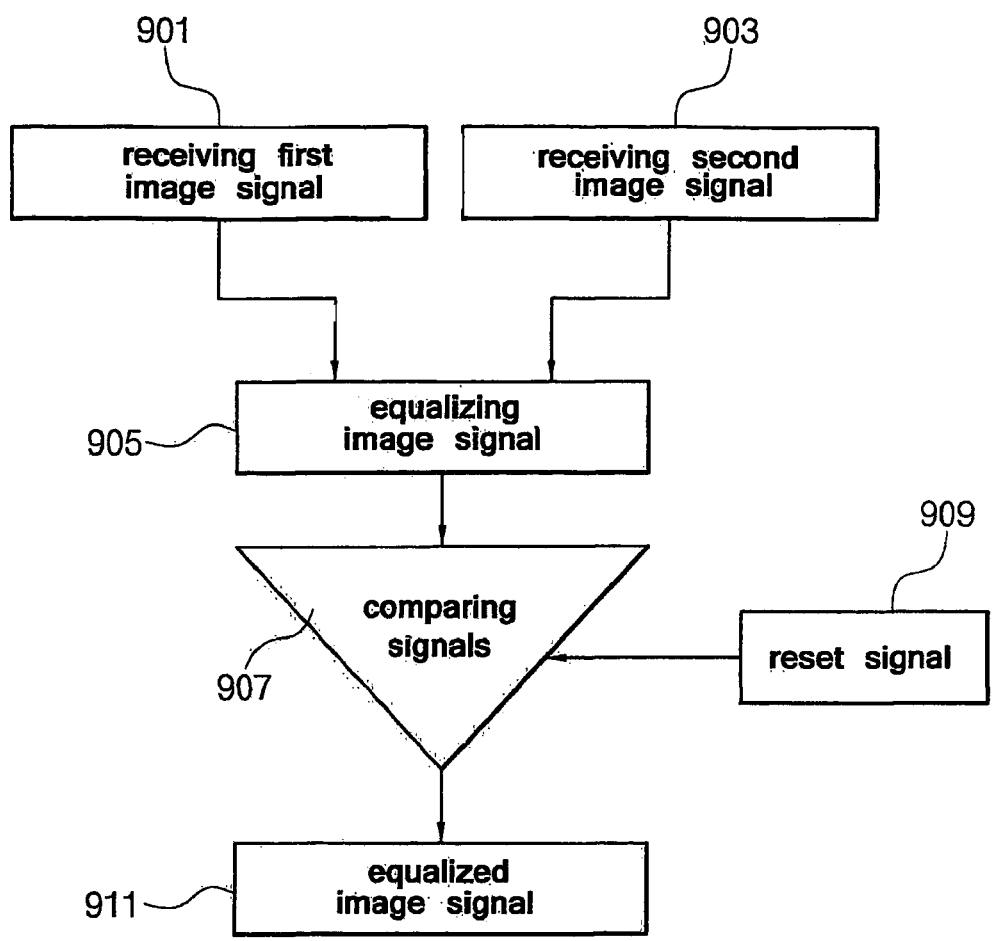
FIG. 18 is a diagram showing a signal processing sequence in the processor device having the same function as the switch unit capable of providing the wide dynamic range mode according to the embodiment of the present invention.

FIG. 18 is a diagram showing a signal processing sequence in the processor device having the same function as the switch unit capable of providing the wide dynamic range mode according to the embodiment of the present invention.

Referring to FIG. 18, the first signal reception unit receives the first image signal at step 901. Then, the second signal reception unit receives the second image signal at step 903.

Then, the first image signal and the second image signal are stored in the memory and then the control unit equalizes the first image signal and the second image signal at step 905. The control unit receives the average reset signal stored in the processor at step 909 and compares the equalized image signal with the average reset signal at step 907.

Finally, the equalized image data signal is output based on the equalized image signal and the average reset signal at step 911.

The present invention is not limited to the above embodiments, and many modifications can be made by those skilled in the art within the spirit of the invention.

The invention claimed is:

1. An image sensor, comprising:
   a photodetector which generates image signals;
   at least two storage units which store at least two image signals respectively;
   another storage unit which stores a previously stored reset signal;
   a comparator having a first electrode and a second electrode connectable to the at least two storage units; and
   a plurality of switch units including:
      a first switch unit constructed to connect the photodetector to the at least two storage units for permitting transfer of the at least two image signals generated in the photodetector, the first switch unit being constructed to switch the respective image signals to be stored in one of the at least two storage units;
      a second switch unit constructed to connect the at least two storage units to each other for equalizing the respective image signals stored in the at least two storage units; and
      another switch unit constructed to connect the another storage unit to the second electrode of the comparator to apply the previously stored reset signal to the second electrode.

2. The image sensor as set forth in claim 1, wherein the storage units are capacitors.

3. The image sensor as set forth in claim 1, wherein the first switch unit includes at least two switches respectively connected to the at least two storage units.

4. The image sensor as set forth in claim 3, wherein the at least two switches are transistors.

5. The image sensor as set forth in claim 1, wherein the second switch unit is a transistor.

6. The image sensor as set forth in claim 1, wherein the image signals stored in the at least two storage units are represented by voltages.

7. The image sensor as set forth in claim 1, wherein the second switch unit is connected in series to each of the at least two storage units.

8. The image sensor as set forth in claim 1, wherein the image signals are equalized by switching of the second switch unit.

9. The image sensor as set forth in claim 1, wherein the equalized image signals are respectively stored in the at least two storage units.

10. An image sensor, comprising:
 a photodetector which generates image signals;
 at least two storage units which respectively store at least two image signals;
 a plurality of switch units including:
  a first switch unit constructed to connect the photodetector to the at least two storage units for permitting transfer of the at least two image signals generated in the photodetector, the first switch unit being constructed to switch the respective image signals to be stored in one of the at least two storage units; and
  a second switch unit constructed to connect the at least two storage units to each other for equalizing the respective image signals stored in the at least two storage units;
 a first input line to which an equalized image signal is input;
 a second input line to which a predetermined average reset signal is input; and
 a comparator connected to the first input line and second input line, the comparator for comparing the equalized image signal with the predetermined average reset signal.

11. The image sensor as set forth in claim 10, further comprising another storage unit to store the predetermined average reset signal, and the plurality of switch units further includes another switch unit constructed to connect the another storage unit to the second input line to apply the predetermined average reset signal to the second input line.

12. An image sensor, comprising:
 a photodetector which generates image signals;
 at least two storage means for storing at least two image signals respectively;
 another storage means which stores a previously stored reset signal;
 a comparator having a first electrode and a second electrode connectable to the at least two storage means; and
 a plurality of means for switching including:
  a first switching means constructed to connect the photodetector to the at least two storage means for permitting transfer of the at least two image signals generated in the photodetector, the first switch means being constructed to switch the respective image signals to be stored in one of the at least two storage means;
  a second switching means constructed to connect the at least two storage means to each other for equalizing the respective image signals stored in the at least two storage means; and
  another switching means constructed to connect the another storage means to the second electrode of the comparator to apply the previously stored reset signal to the second electrode.

13. The image sensor as set forth in claim 12, wherein the storage means are capacitors.

14. The image sensor as set forth in claim 12, wherein the first switching means includes at least two switches respectively connected to the at least two storage means.

15. The image sensor as set forth in claim 12, wherein the switching means are transistors.

16. The image sensor as set forth in claim 12, wherein image signals are equalized by switching of the second switching means.

17. The image sensor as set forth in claim 12, wherein the equalized image signals are respectively stored in the at least two storage means.

* * * * *